United States Patent
Chamot et al.

(10) Patent No.: US 6,505,580 B2
(45) Date of Patent: Jan. 14, 2003

(54) DRIVEN PROPORTIONAL-CONTROL THERMOSTATIC DEVICE WITH BACK-UP THERMOSTATIC ELEMENT

(75) Inventors: Jean-Pierre Chamot, Arpajon (FR); Gérard Jean André Le Clanche, Draveil (FR); Lionel Jean Mabboux, Ste Genevieve des Bois (FR); René Jean Claude Mas, Bretigny sur Orge (FR); Eddy Jure, Change (FR)

(73) Assignee: Vernet S.A., Arpajon Cedex (FR)

( * ) Notice: Subject to any disclaimer, the term of this patent is extended or adjusted under 35 U.S.C. 154(b) by 0 days.

(21) Appl. No.: 09/904,543

(22) Filed: Jul. 16, 2001

(65) Prior Publication Data

US 2002/0007806 A1 Jan. 24, 2002

(30) Foreign Application Priority Data

Jul. 17, 2000 (FR) ............................................. 00 09336

(51) Int. Cl.[7] .................................................. F01P 7/16
(52) U.S. Cl. .................. 123/41.1; 236/34.5; 236/101 C
(58) Field of Search ............................ 236/101 C, 34.5, 236/34; 123/41.31, 41.08, 41.09, 41.1

(56) References Cited

U.S. PATENT DOCUMENTS

| 4,961,530 | A | * | 10/1990 | Wagner | ..................... 236/34.5 |
| 5,385,296 | A | | 1/1995 | Kurz et al. | ................ 236/34.5 |
| 5,482,010 | A | | 1/1996 | Lemberger et al. | ........ 123/41.1 |
| 5,494,005 | A | | 2/1996 | Saur | ......................... 123/41.29 |
| 5,676,308 | A | | 10/1997 | Saur | .......................... 236/34.5 |
| 5,711,258 | A | | 1/1998 | Saur | |

FOREIGN PATENT DOCUMENTS

| DE | 197 28 009 | 1/1999 | ............. F01P/7/16 |
| EP | 189 565 | 8/1986 | ............. F01P/7/16 |
| EP | 484 624 | 5/1992 | ............. F01P/7/16 |
| EP | 0 694 423 | 1/1996 | ............. B60H/1/00 |
| FR | 2 703 730 | 10/1994 | ............. F01P/3/20 |
| FR | 2 708 042 | 1/1995 | ............. F01P/7/16 |
| FR | 2 709 787 | 3/1995 | ............. F01P/7/16 |
| FR | 2 745 033 | 8/1997 | ............. F01P/7/16 |

* cited by examiner

Primary Examiner—Willis R. Wolfe
(74) Attorney, Agent, or Firm—Wenderoth, Lind & Ponack, L.L.P.

(57) ABSTRACT

The invention relates to a valve-type device including a housing having a fluid access (7) which is shut off by a shutter (9) secured to an actuator (10) as a function of the temperature of the fluid passing through the device. The device also includes an expanding-material safety thermostatic element (22) located in the stream of fluid passing through the housing. The element 22 actuates the shutter (9) when, as a result of defective operation of the actuator (10) or of its control equipment, the shutter has not been moved by the actuator. The actuator also consists of an expanding-material thermostatic element containing a heating means (13) connected to control equipment.

14 Claims, 2 Drawing Sheets

DRIVEN PROPORTIONAL-CONTROL THERMOSTATIC DEVICE WITH BACK-UP THERMOSTATIC ELEMENT

BACKGROUND OF THE INVENTION

The invention relates to a valve type of thermostatic device with a proportional-control actuator. The actuator includes a thermostatic element, such as a conventional expanding-wax thermostatic element, to give the device a back-up mode of operation if the actuator or its control gear should prove defective.

Thermostatic devices of the valve type are used, for example, in internal combustion engine cooling circuits for regulating the temperature of the cooling liquid (generally an aqueous mixture known as "coolant") introduced into the engine in order to optimize its operation. These devices act on a flow of "hot" liquid coming from the vehicle engine and/or a flow of "cold" liquid coming from a cooling radiator, and these flows are mixed to form a "warm" cooling liquid which is reintroduced into the engine.

It should be noted that the words "hot", "cold" and "warm" are used with a view to simplifying the vocabulary to indicate relative temperature levels of the three streams of liquid when the device is operating in steady state. However, the respective temperatures of these three streams may be very similar, and may even be identical when the thermostatic device is still closed.

Thermostatic devices motorized by means of an electric motor comprising a back-up thermostatic element are already known. These devices may, for example make it possible, inside a chamber of the device, to mix a stream of cold liquid with the stream of hot liquid even when the engine or its control gear are defective, if the temperature of the liquid in which the thermostatic element is immersed exceeds a desired value. One particular example of this type of device is known from the French patent published under the number 2 703 730.

The thermostatic device in that document 2 703 730 is motorized by means of an electric motor comprising a rotary output shaft actuating the moving shutter of the thermostatic device by means of a conventional screw-nut coupling system that converts the rotary movement of the shaft into a translational movement. This moving shutter, such as a spool or "plug," gradually uncovers a cold liquid inlet access of this device at the same time as it gradually shuts off a hot liquid inlet access, and vice versa. The back-up thermostatic element is aligned with the screw of the screw-nut system. When its temperature rises, its piston exerts a force on them plug, if the latter has not been moved or has not been moved far enough by the screw-nut system, and the force is oriented in the direction to uncover the cold liquid inlet access and to shut off the hot liquid inlet access so that under the thrust of the piston of the thermostatic element, the spool can actually move in that direction. The screw-nut system coupling is telescopic and, more specifically, mounted so that it can slide on the shaft of the motor, urged by a spring towards the plug in the direction to uncover the hot liquid inlet access and to shut the cold liquid inlet access. Thus, when the thermostatic element exerts a force on the plug in the opposite direction which is higher than that of the spring, in order to shut off the hot liquid inlet access and uncover the cold liquid inlet access, the spring is compressed by the retraction of the screw-nut system and there is then nothing to prevent this respective shutting-off and uncovering.

Because this device is of the plug valve type, it has a configuration which is sometimes difficult to tailor to certain engine and cooling circuit structures. Another disadvantage of this device is that when the temperature of the liquid in which the thermostatic element is immersed decreases, the screw-nut system accompanies the retracting movement of the thermostatic element which, because the electric motor or its control gear is defective, leads to a further rise in temperature, a further elongation of the thermostatic element, and an operation which tends towards instability with "warm" liquid at a temperature appreciably higher than the desired temperature. In addition, the thermostatic element has to be relatively powerful in order to overcome the resistive force of the spring, and the screw-nut system with its telescopic spring-loaded mounting is relatively bulky, which means that the dimensions of the thermostatic device cannot be reduced as far as might be necessary.

SUMMARY OF THE INVENTION

It is an object of the invention to overcome these drawback. The invention therefore relates to a thermostatic device comprising a housing including fluid accesses so that it is possible for at least one fluid access to be shut off by a shutter. A metering actuator fixed to the housing and equipped with an output stem that can move in translation and is mechanically connected to the shutter in order to actuate this shutter in terms of translation selectively in a direction in which it gradually shuts off the access that can be shut off and in a direction in which it gradually, as a function of at least one engine operating parameter detected by at least one sensor, uncovers the access. A safety thermostatic element is situated at least partially in the stream of fluid and includes a part designed to actuate the shutter in translation when, as a result of defective operation, the latter has not been actuated by the metering actuator and the temperature of the stream of fluid exceeds, by a predetermined value, the temperature which should have given rise to such actuation by this actuator. The metering actuator is a proportional-control actuator consisting of an expanding-material thermostatic element also containing a heating means associated with the means for connecting the heating means to control gear involving a computer connected to the sensor, by which the metering actuator is driven through the connecting means.

By virtue of the fact that the proportional-control metering actuator is a thermostatic element designed to be heated at the command of a computer, rather than an electric motor such as a stepping motor, the cost price of the thermostatic device is appreciably lowered.

Conventional devices with two thermostatic elements have a metering thermostatic element, the expanding material of which is heated only by the fluid passing through the housing, and also have a thermostatic element for adjusting the threshold at which regulation began, and could be heated or not at the command of a computer. Thus a comparison between the conventional device and the present invention will clearly demonstrate that the device according to the present invention makes it possible to obtain a vehicle engine operating temperature which is always optimum from two points of view, including fuel consumption and pollutant emissions, irrespective of the load on this engine.

The thermostatic device may also exhibit one or more of the following features.

The heating means may comprise a resistive electrical component, and the connecting means may be electrical conductors designed to connect the resistive component to the control gear comprising the vehicle on-board computer.

The safety thermostatic element may be set to actuate the shutter in the opening direction at a fluid temperature a few degrees higher than the temperature at which the metering actuator is set to actuate the shutter in that direction.

The metering thermostatic element may be arranged in the housing downstream of the access that can be shut off by a shutter.

The metering thermostatic element may be carried by a support extending into a duct belonging to the housing.

The metering thermostatic element and the safety thermostatic element may be arranged one on each side of the access that can be shut off, and the metering thermostatic element may have an output stem which can move in terms of translation and which projects towards the shutter. The safety thermostatic element may have a piston, also projecting towards the shutter and facing the output stem, and the piston may be fixed to the output stem.

The safety thermostatic element may have a collar housed at least partially in skirt of the shutter.

The device may comprise a return spring resting against the shutter to exert a force on it that tends to return it in the direction of closing.

Finally, the output stem and the piston are secured together with the interposition of a thrust washer designed to be able to rest selectively, at the end of travel, against the free end of a ring of the metering element and against the free end of a ring of the back-up element.

BRIEF DESCRIPTION OF THE DRAWINGS

Other features and advantages of the invention will become apparent from the description which will follow of one embodiment of the invention illustrated by the appended drawings in which.

DETAILED DESCRIPTION OF THE INVENTION

Figure 1:
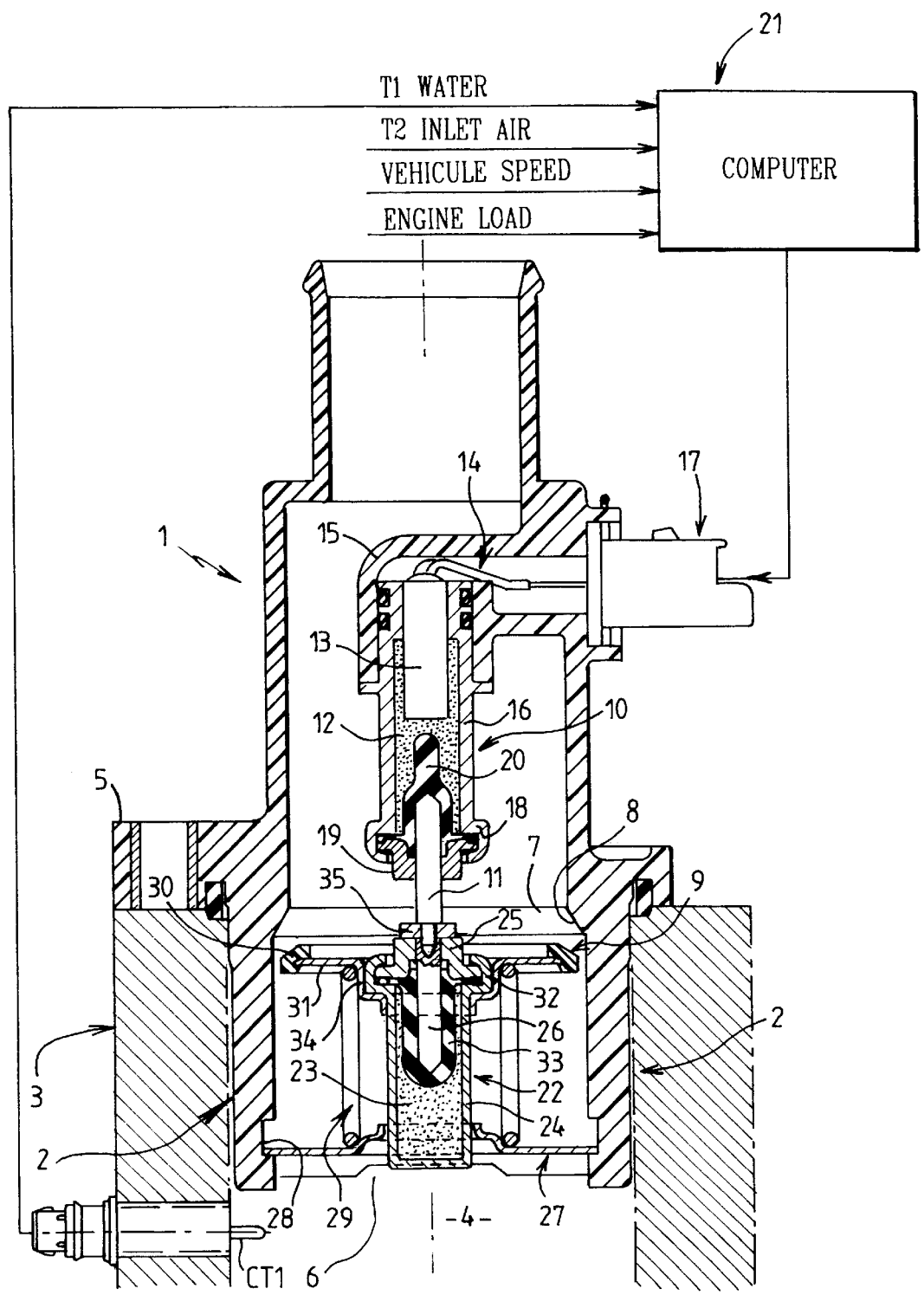
FIG. 1 is a diagrammatic section view of a thermostatic device according to the invention in a condition in which the moving shutter of the device is subjected to the action of the metering actuator when the latter and/or its control gear is or are not defective.
Figure 2:
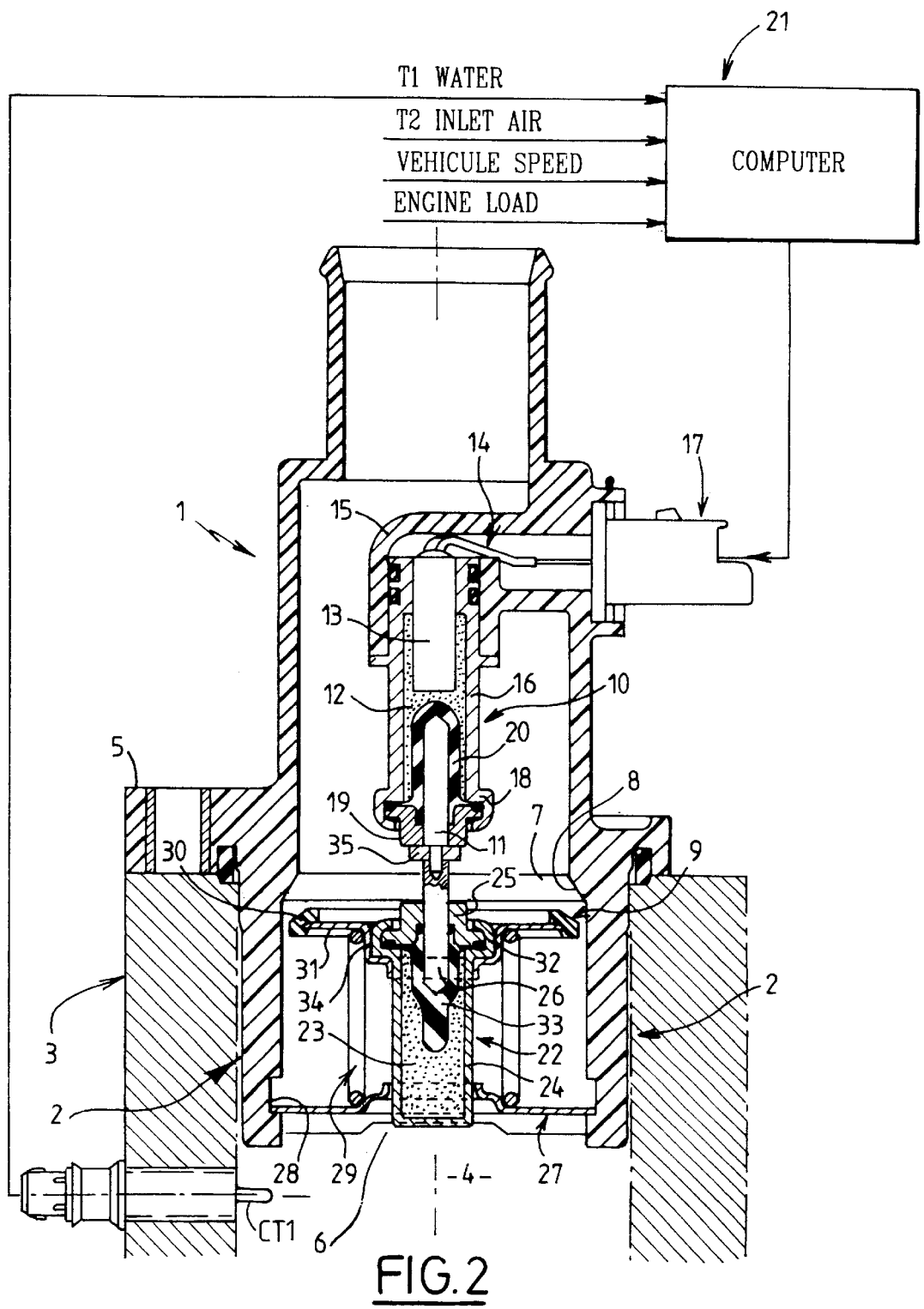
FIG. 2 is a diagrammatic section view of a thermostatic device according to the invention in a condition in which, as the actuator and/or its control gear is or are defective, the back-up thermostatic element has taken over to actuate the moving shutter.

In order not to overload the drawing, a certain number of components and lines relating to components which are behind the section planes have not been depicted in the figures, but the arrangement of the device according to the invention will be made easier to understand by the description which will follow.

The thermostatic device depicted comprises, in the known way, various members housed in a housing. The housing is generally made of synthetic material, formed of a duct or pipe 1, and may be straight or may be elbowed. Fingers 2, housed in a body 3 consisting of a region of a vehicle engine surrounding a passage 4 through which the engine cooling liquid passes are carried on pipe 1. The passage is hollowed out in this region and one or more conduits for the circulation of fluid, such as a cooling liquid, terminate therein. The pipe 1 is externally equipped with a fixing flange 5 via which it is fixed to the body, for example by screws. The region of its free end opposite to its end region which has the fingers 2 is designed for another duct such as a hose to be attached to it.

In this case, the pipe 1 and the passage 4 have an axisymmetric overall shape with a cross section at right angles to the axis which is approximately circular, and the axes run, in alignment, along one and the same central longitudinal axis, in a first direction.

The region of the housing running into the passage 4 has at least one first access (fluid inlet) 6 for fluid coming from the engine, and a second access (fluid outlet) 7 for transmitting in the downstream direction some of the fluid which is intended to be recirculated, generally by means of a water pump.

The first access 6 lies near the free end of the fingers 2, and the second access 7 is delimited by the end region of the duct 1, to which the fingers are connected. At this second access 7, the interior surface of the pipe 1 has a frustoconical shape widening towards the first access to form a seat 8 for a shutter which here consists of a shutter element 9 for metering the fluid allowed to flow through the passage 4 to the pipe 1. The region of the housing that runs between the first access 6 and the seat 8 will hereafter be referred to as the "upstream region" of the housing, while the region which runs beyond the seat 8 into the pipe 1 towards the free end thereof will be termed the "downstream region" of the housing.

In order to selectively actuate the shutter element 9 in translation in a direction in which it gradually shuts off the fluid outlet access 7 and in a direction in which it progressively (particularly as a function of the temperature of the stream of cooling fluid passing through the thermostatic device detected by a sensor CT1 immersed in this stream approximately at the first access 6) opens the access 7, the device comprises a metering actuator 10 fixed to the housing and equipped with an output stem 11 mechanically connected to the shutter element 9.

More specifically, the metering actuator 10 is a linear motor consisting of a thermostatic element including an expanding material 12, such as expanding wax, and also including a means for heating this material, such as a resistive electrical component 13. Connecting means 14 connects the heating means to control equipment (i.e., a controller) designed to cause the thermostatic element to operate as a proportional-control linear motor. More specifically, in this case, the electrical power supplied to the thermostatic element 10 (and the travel of the stem 11) is proportional to the difference between the measured temperature of the fluid and a programmed-in reference temperature. Control may also be integral (proportional action at the "surface" of the difference) and/or derivative (partial compensation for dead times), and it is also possible to use "fuzzy logic."

The resistive electrical component 13 may be a simple electrical resistor, a helix-wound resistor known commercially by the name of THERMOCOAX, a resistor printed onto an insulating wafer, a resistive rod, or a thermistor known in the art by the name C.T.P. The connecting means 14 is an electrical conductor connected to the resistive component 13.

The thermostatic element constituting the metering actuator 10 is carried by an elbowed tubular support 15 integrally connected to the housing and running inside the housing in its downstream region. the tubular support 15 opens to the outside of the pipe 1 via an orifice pierced in the side wall of pipe 1, and opens to the inside of the pipe via a circular orifice centered on the central longitudinal axis common to the pipe 1 and to the passage 4 and opening towards the seat 8. The support 15 thus has a first portion running in the first direction defined above as being that of the aforementioned longitudinal axis of the device, in which the envelope 16 of the thermostatic element is fixed, and a second portion running in a second direction at right angles to the first direction in the particular instance in which the pipe 1 is not elbowed, and in which in this instance a grommet 17 is fixed for the passage of the electrical conductors which constitute the connecting means 14. As an alternative, the second portion may be used for fixing an electrical connector to which the conductors 14 are connected.

The resistive component 13 is fixed at one of its ends into an end region of the envelope 16 which is inserted into the first portion of the support 15, and the greater part of the length of resistive component 13 runs into the mass of expanding material 12. The opposite end region of the envelope 16, the greater part of the length of which extends into the pipe 1 outside the support 15, comprises a collar 18 in which is crimped a ring 19 forming a guide support for the output stem 11 which passes slidingly through the ring 19 and to which is fixed a deformable tubular cap 20 lodged in the mass of expanding material contained in the envelope 16. The region of the output stem 11 that runs inside the envelope 16 is inserted into the cap 20. By contrast, it is the region of the output stem 11 which projects out of the envelope 16 and out of the ring 19 towards the shutter element 9 which is connected mechanically to the shutter element 9 in order to actuate it in translation.

The operation of the metering actuator 10 is controlled by equipment (controller) comprising a computer 21 which may be the vehicle on-board computer or may be a separate computer. The computer 21 receives information about the temperature T1 of the cooling fluid, transmitted to it by the sensor CT1 immersed in the stream of fluid upstream of the seat 8 for the shutter element, and possibly also receives information about the air temperature T2 at the engine inlet, information about the vehicle speed, information about the engine load, and/or information about the external temperature, which items of information are transmitted to it by appropriate sensors. In order to slave or at least drive the metering actuator 10 using the computer control equipment, the computer 21 is connected to the actuator 10 directly by the connecting conductors 14 or through any conductor that might be fixed into the support 15.

The thermostatic device according to the invention further comprises a safety thermostatic element 22 also containing an expanding material 23 which is an expanding wax, but without internal heating means. An envelope 24 of the element 22 is immersed in the cooling fluid passing through the upstream region of the housing. This safety element 22 is arranged in line with the metering actuator 10 by being centered on the central longitudinal axis of the pipe 1 and of the passage 4, but in opposition to the metering element. The closed end of envelope 24 is approximately in line with the free end of the fingers 2, and ring 25 forms a guiding support for piston 26 and is approximately level with the shutter element 9.

More specifically, the end region of the envelope 24 near the bottom thereof is centered between the fingers 2 by being mounted to slide in a hole in the central part of a bridge element 27 carried by the fingers 2 and running in the upstream region of the housing. For this purpose, the bridge element 27 has branches projecting radially towards the fingers 2, and the free ends of the branches are housed in respective notches 28 of the fingers near the free end of the fingers and are in abutment against bottom surfaces of these notches, which run at right angles to the longitudinal axis of the housing, due to the action of a helical spring 29. This spring, surrounding the safety element 22, has one of its ends resting against the branches of the bridge element and has the opposite end resting against the shutter element 9.

The shutter element 9 includes a bearing annulus 30 made of synthetic material which, facing the seat 8, has an approximately frustoconical surface with a diameter that increases towards the fluid inlet access 6. The bearing annulus 30 is designed to rest against the seat 8 when the shutter element is in the closed position. The element 9 also includes a metallic reinforcement 31 in the form of a dish with a circular periphery, and the peripheral region of the reinforcement 31 is inserted in the interior surface of the bearing annulus 30. The central regions of the bridge element 27 and of the metallic reinforcement 31 surrounding the envelope 24 of the safety element 22 comprise, facing each other, respective approximately cylindrical skirts for centering the helical spring 29 around the envelope 24.

At the end opposite to its bottom near the free end of the fingers 2, the envelope 24 has a collar 32 in which is crimped the ring 25 through which the rod of the piston 26 passes. The rod is mounted to slide in the ring and is also fixed to a deformable tubular cap 33 housed in the mass of expanding material contained in the envelope 24. The region of the rod of the piston 26 extending into the envelope is inserted into cap 33. The collar 32 is housed at least partially in the skirt 34 of the metallic reinforcement 31, and the surface of its shoulder connects to the cylindrical part of the envelope containing the expanding material, extends in a plane perpendicular to the longitudinal axis of the housing, and rests against the bottom of the skirt of the metallic reinforcement 31.

The mechanical connection between the metering actuator 10 and the safety element 22 with the shutter element 9 allows, in normal operation, proportional actuation of the shutter element by the metering element under the control of the gear involving the computer. In the event of defective operation of the metering actuator 10 and/or its control equipment, the connection also allows actuation of the shutter element by the safety element.

This mechanical connection is extremely simple because all that is required is for the output stem 11 of the metering element and the piston 26 of the safety element to be fixed together with the interposition of a thrust washer 35 projecting annularly with respect to the stem 11 and the piston 26. The washer 35 is arranged at the end of travel, to rest selectively against the free end of the ring 19 of the metering actuator and against the free end of the ring 25 of the back-up element. For example, the stem 11 at its free end has a threaded finger and the piston 26 at its free end has a tapped hole into which this threaded finger, around which the thrust washer 35 is slipped, is screwed.

Thus, the flow of the cooling liquid can be regulated according to the temperature of the water circuit, the air inlet temperature, the vehicle speed, the engine load and the external temperature, by moving the shutter element 9 away from the seat at will. The flow and the temperature in the water circuit can be set to the optimum value for obtaining maximum consumption saving and minimum pollution for each phase in the operation of the engine regardless of the load thereon. More specifically, the thermostatic device according to the invention and its control gear can be set so that, when the gearbox is in a given gear, the voltage applied to the metering actuator 10 follows the variations in vehicle speed and maintains a cooling fluid temperature at the outlet of the engine which is approximately constant, for example within a 4° C. range. When the cooling fluid temperature sensor detects that the amount by which optimum temperature is exceeded is greater than a predetermined value, suggesting defective operation of the metering actuator 10 or of its control equipment, the safety element 22 positioned upstream of the shutter element 9 moves the shutter element 9 to a distance which is itself predetermined according to an algorithm in the computer which takes account of the information delivered by the other sensors. The value of the threshold at which the safety element 22 comes into operation can be chosen, for example, in a range from 2° C. to 5° C. higher than the ideal set temperature for high temperatures. For example, in the case of an ideal temperature of 100° C. to 102° C., it may be possible to choose a temperature of 104° C. for the temperature at which the safety element begins to open, and a temperature of 110° C. at which it is wide open.

Alarm equipment may be connected to the computer to let the driver of the vehicle know if it becomes impossible to set to the ideal temperature, in which case the vehicle will have to be taken to a workshop where the cooling circuit can be checked out, adjusted and, if necessary, repaired.

By virtue of the fact that the metering actuator 10 is downstream of the shutter element 9, the reaction time for opening the shutter element when the shutter is first opened in operation, is shortened.

By virtue of the fact that this element is a thermostatic element heated under the control of a computer, operation similar to that of a thermostatic device with a stepping motor and reversible screw is obtained. Hence, an appreciably less complex set-up is achieved at an appreciably lower cost.

Of course, the invention is not restricted to the form of the embodiment described hereinabove and depicted, and others may be envisaged without departing from its scope.

What is claimed is:

1. A thermostatic device comprising:
    a housing having a fluid inlet, a fluid outlet, and a valve seat at said fluid outlet
    a shutter for opening and closing said valve seat;
    a sensor for detecting at least one engine parameter and for generating at least one detection signal based on the at least one detected engine parameter;
    a controller including a computer for receiving the at least one detection signal generated by said sensor and for generating an operating signal based on the at least one detection signal;
    a metering actuator fixed to said housing and including:
        an expanding-material thermostatic element including a heating device;
        a connector for connecting said controller to said heating device such that said heating device is operated based on the operating signal received from said controller via said connector; and
        an output stem movably connected to said expanding-material thermostatic element and operable to move in translation, said output stem being connected to said shutter so as to selectively move said shutter in translation in a closing direction to close said valve seat and in an opening direction to open said valve seat based on the operating signal; and
    a safety thermostatic element arranged so as to be at least partially submerged in a stream of fluid flowing through said housing, and being connected to said shutter and operable to selectively move said shutter when said shutter has not been moved by said metering actuator and when a temperature of the fluid reaches a predetermined temperature.

2. The device of claim 1, wherein said heating device comprises a resistive electrical component and said connector comprises electrical conductors electrically connecting said resistive electrical component to said controller.

3. The device of claim 1, wherein said predetermined temperature is 2° C. to 5° C. higher than a fluid temperature at which said metering actuator is set to move said shutter in the opening direction.

4. The device of claim 1, wherein said metering actuator is arranged in said housing downstream of said valve seat at said fluid outlet.

5. The device of claim 1, wherein said housing is formed of a duct, said metering actuator being supported by a support extending into said duct.

6. The device of claim 1, wherein said metering actuator and said safety thermostatic element are arranged on opposite sides of said valve seat at said fluid outlet, said safety thermostatic element including a piston fixed to said output stem of said metering actuator and connected to said shutter.

7. The device of claim 6, wherein said metering actuator includes an actuator ring and said safety thermostatic element includes a safety ring, said piston being connected to said output stem so as to have a washer interposed therebetween, said output stem and said piston being operable to move in translation so that said washer rests against one of said actuator ring and said safety ring.

8. The device of claim 6, wherein said safety thermostatic element further includes a collar, and said shutter includes a skirt, said collar being at least partially arranged in said skirt.

9. The device of claim 8, wherein said metering actuator includes an actuator ring and said safety thermostatic element includes a safety ring, said piston being connected to said output stem so as to have a washer interposed therebetween, said output stem and said piston being operable to move in translation so that said washer rests against one of said actuator ring and said safety ring.

10. The device of claim 6, further comprising a return spring abutting said shutter so as to exert a closing force on said shutter tending to move said shutter toward said valve seat.

11. The device of claim 10, wherein said metering actuator includes an actuator ring and said safety thermostatic element includes a safety ring, said piston being connected to said output stem so as to have a washer interposed therebetween, said output stem and said piston being operable to move in translation so that said washer rests against one of said actuator ring and said safety ring.

12. The device of claim 1, wherein said expanding-material thermostatic element further includes an envelope and expanding material accommodated in said envelope, said heating device being arranged in said envelope so as to have an end extending into said expanding material.

13. The device of claim 12, wherein said metering actuator further includes a flexible cap arranged in said envelope so as to contact said expanding material and positioned over a first end of said output stem extending into said envelope, a second end of said output stem opposite said first end being connected to said shutter.

14. The device of claim 13, wherein said safety thermostatic element includes a safety envelope, expanding material accommodated in said safety envelope, a flexible cap arranged in said envelope so as to contact said expanding material and positioned over a first end of a piston extending into said safety envelope, wherein a second end of said piston opposite said first end is connected to said shutter and to said second end of said output stem.

* * * * *